United States Patent
Smith

(10) Patent No.: US 8,825,766 B2
(45) Date of Patent: Sep. 2, 2014

(54) METHODS, SYSTEMS AND COMPUTER PROGRAM PRODUCTS FOR A PEER-TO-PEER CACHE CONTENT REPLACER

(75) Inventor: Donald E Smith, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 690 days.

(21) Appl. No.: 12/605,285

(22) Filed: Oct. 23, 2009

(65) Prior Publication Data
US 2011/0099228 A1    Apr. 28, 2011

(51) Int. Cl.
G06F 15/16 (2006.01)
H04N 21/63 (2011.01)
H04N 21/658 (2011.01)
H04N 21/231 (2011.01)
H04N 21/472 (2011.01)

(52) U.S. Cl.
CPC ......... *H04N 21/632* (2013.01); *H04N 21/6582* (2013.01); *H04N 21/23103* (2013.01); *H04N 21/47202* (2013.01)
USPC ........................... 709/205; 725/134; 725/142

(58) Field of Classification Search
USPC ........................... 709/205; 725/105, 134, 142
See application file for complete search history.

(56) References Cited

U.S. PATENT DOCUMENTS

| | | | |
|---|---|---|---|
| 2002/0073167 A1* | 6/2002 | Powell et al. | 709/217 |
| 2005/0097085 A1* | 5/2005 | Shen et al. | 707/3 |
| 2007/0250880 A1* | 10/2007 | Hainline | 725/97 |
| 2008/0141321 A1* | 6/2008 | Kubat et al. | 725/110 |

* cited by examiner

*Primary Examiner* — Liangche A Wang
*Assistant Examiner* — Cheikh Ndiaye

(57) ABSTRACT

The METHODS, SYSTEMS AND COMPUTER PROGRAM PRODUCTS FOR A PEER-TO-PEER CACHE CONTENT REPLACER ("P2PCCR") rates the value of storing specified existing content and replaces the lowest rated existing content with the requested new content. In one embodiment, a method for content replacement that may be used in a peer to peer video on demand system is described. The method includes receiving a request for new content, obtaining usage and availability data, determining a value rating based on the usage and availability data, and replacing lowest value rated content with said new content.

25 Claims, 8 Drawing Sheets

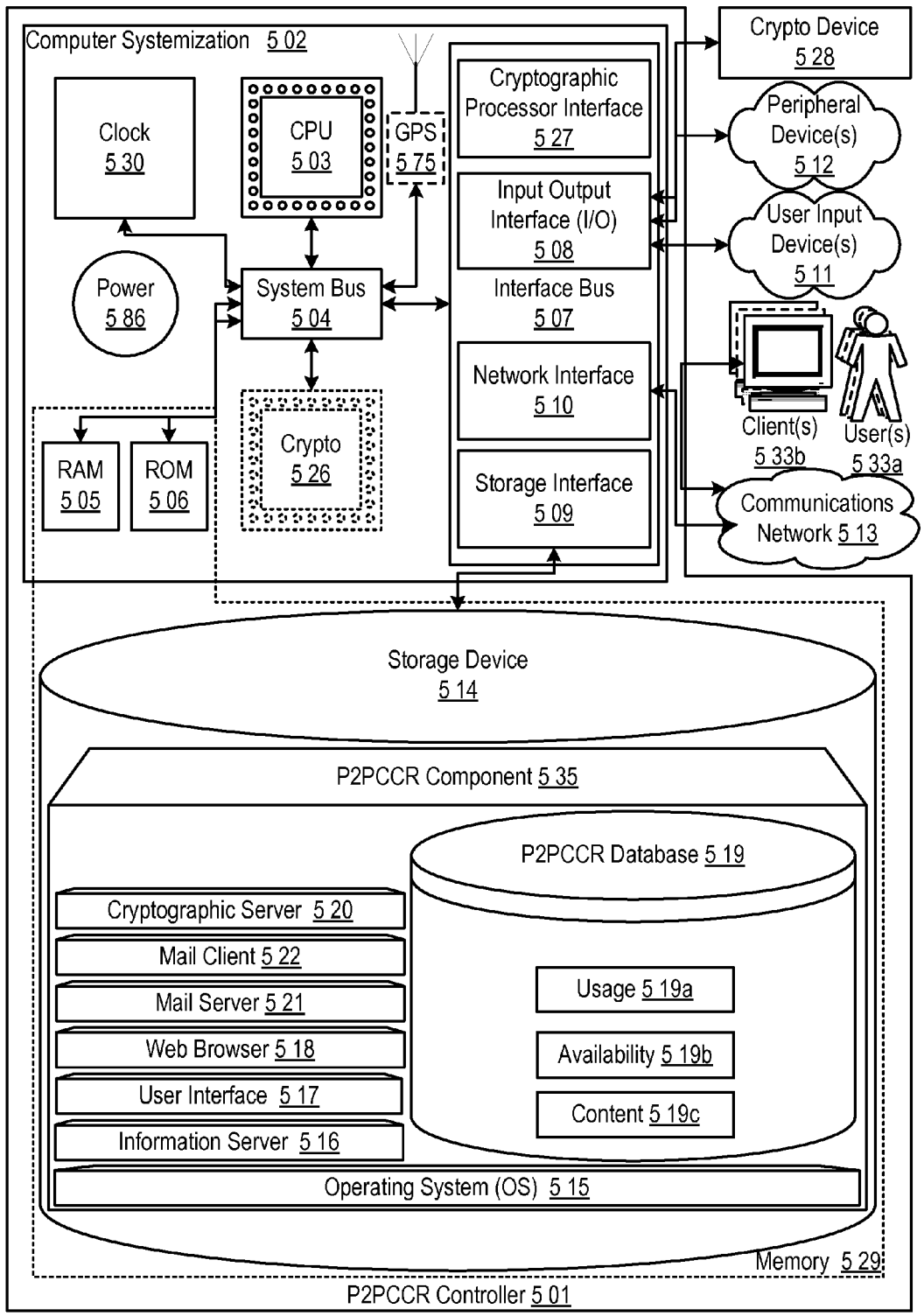

METHODS, SYSTEMS AND COMPUTER PROGRAM PRODUCTS FOR A PEER-TO-PEER CACHE CONTENT REPLACER

BACKGROUND

The advent of electronic communication networks changed the way multimedia content is delivered to people around the globe. Previously, obtaining content, such as video and audio, required going to a store. Now, content can be obtained over a network without leaving the house. Digital communication technologies improved the quality of the transmitted content and increased the speed at which the content may be delivered. Improvements in storage technologies make it possible not only to view, but also to store delivered content at its destination. Various devices, such as set top boxes, exist to facilitate delivery, over a network, of various content.

BRIEF DESCRIPTION OF THE DRAWINGS

The accompanying drawings illustrate various non-limiting, example, inventive aspects in accordance with the present disclosure:

FIG. 5 illustrates inventive aspects of a P2PCCR controller 501 in a block diagram.

Figure 1:
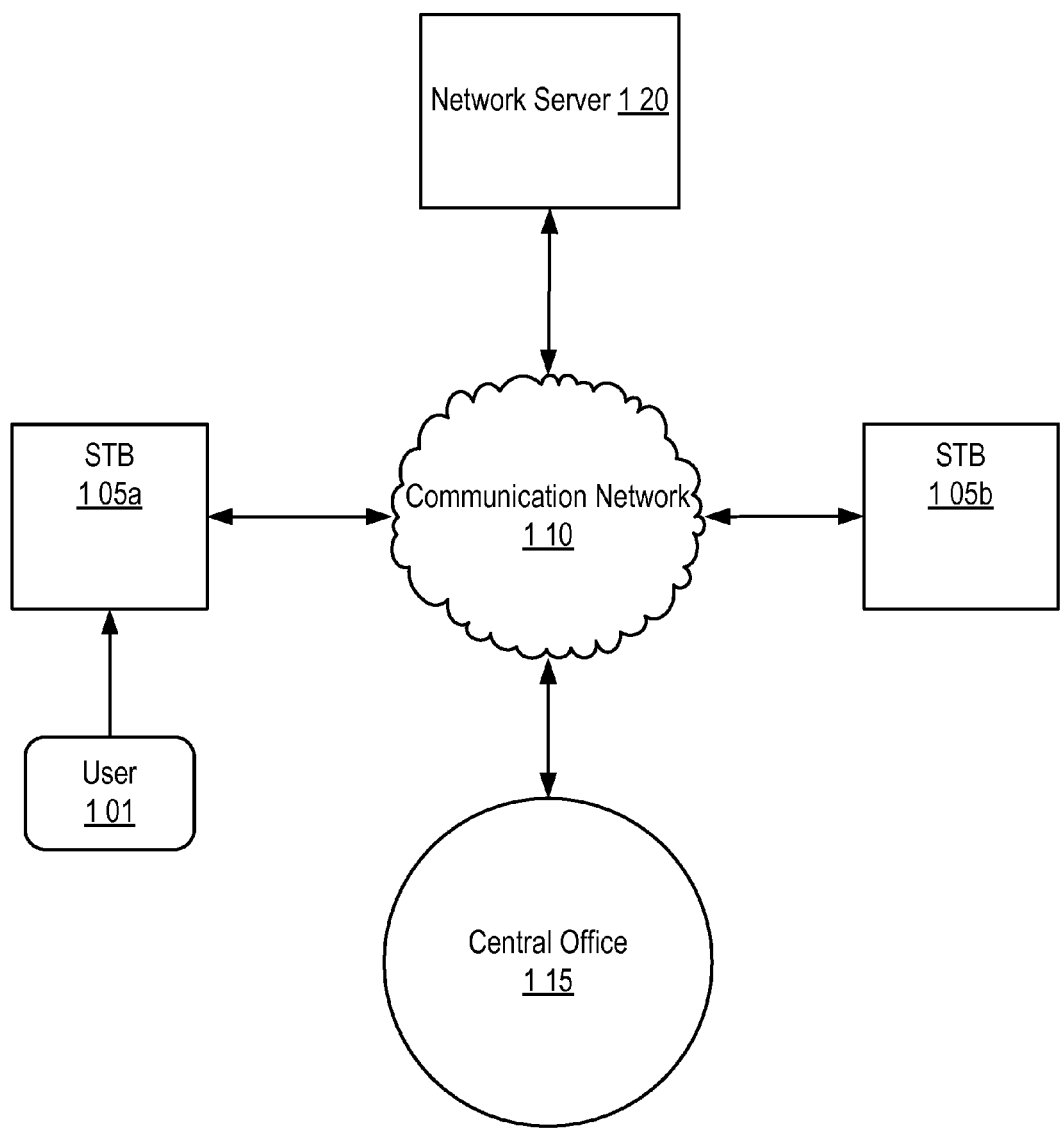
FIG. 1 provides an overview of an implementation of data flow between and among system components and affiliated entities in one embodiment of a Peer-To-Peer Cache Content Replacer (hereinafter "P2PCCR") operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

P2PCCR

This disclosure details the implementation of METHODS, SYSTEMS AND COMPUTER PROGRAM PRODUCTS FOR A PEER-TO-PEER CACHE CONTENT REPLACER (hereinafter "P2PCCR").

Set top boxes (STBs) deliver content, such as video-on-demand (VoD), from an external source, such as a network video server of a provider, to an output device, such as a TV, computer and/or the like screen of a subscriber. VoD systems may store all VoD content on servers of the provider. For example, network video servers may serve a specific region, such as northern New Jersey. Each town in such a region may have a Central Office housing equipment such as servers, routers, switches, and other networking gear that may distribute content from the network video servers to STBs of individual subscribers. Upon receipt of content, a STB may output the content to an output device. A STB may also store the content on a storage device.

The content in a VoD system may have to travel a considerable distance across a network backbone from a network video server of a provider to a STB of a subscriber. In one embodiment, the P2PCCR allows one STB to supply content to another STB, eliminating the transport of that content across the network backbone. In one implementation, the P2PCCR may employ subscribers' STBs (peers) to cache popular content and deliver such content to other subscribers' STBs. When a subscriber requests content, a STB in the network that has the requested content may provide such content, instead of the Network Server. If the requesting and providing peers are close together, using subscribers' STBs instead of the Network Server to provide content may reduce network cost. If no nearby peer has the requested content, the Network Server may provide such content instead.

A STB may have limited storage capacity, often less than a Network Server. Therefore, P2PCCRs may, in various embodiments, receive a request for new content, rate, rank and/or prioritize stored content, decide which stored content to replace if the requester needs additional space for new content, decide what the source of new content should be, deliver new content to the requester, and/or the like.

The instant disclosure discusses embodiments of the P2PCCR primarily within the context of a peer to peer (P2P) VoD system using a STB. However, it is to be understood that various embodiments of the P2PCCR may be readily implemented for a wide range of other applications or uses, and with a wide range of devices. For example, aspects of the P2PCCR may be adapted for use with audio content delivery, non-on-demand systems, P2P file sharing, and/or the like applications or uses. Thus, content, in various embodiments, may include video, audio, images, text, application software and/or the like. Aspects of the P2PCCR may, for example, also be adapted for use with general purpose computers, cell phones, and/or the like devices.

FIG. 1 provides an overview of an implementation of data flow in one embodiment of P2PCCR operation. In FIG. 1, a user 101 is shown requesting media via a communication device. For example, in one embodiment, the communication device may be a STB 105a. The STB 105a may be communicatively coupled to one or more content sources, such as Network Servers, STBs, and/or the like, such as via a communication network 110. In one implementation, the STB 105a may send a request for content to a source of content, such as a Network Server 120, a peer STB 105b, and/or the like. In another implementation, the STB 105a may send a request for content to equipment in a Central Office 115. The instructions to send content may be processed by and/or sent from the source of content, such as a Network Server 120, a peer STB 105b, and/or the like, or the instructions may be processed by and/or sent from equipment in the Central Office 115.

The STB 105a may, in various implementations, receive content from various sources. For example, the STB 105a may receive content from the Network Server 120 or the STB 105a may receive content from the peer STB 105b. The STB 105a may utilize equipment in a Central Office 115 to facilitate receiving content or the STB 105a may receive content from the content source without the help of the equipment in the Central Office 115. The equipment in the Central Office 115 may send and receive data via a communication network 110 and the equipment in the Central Office 115 may distribute content to STBs 105a, 105b of individual subscribers. In one embodiment, the equipment in the Central Office 115 may receive content from a Network Server 120 for distribution to STB 105a. In another embodiment, the equipment in the Central Office 115 may receive content from the peer STB 105b for distribution to STB 105a. In one embodiment, the Network Server 120 may send and receive data via a communication network 110. The Network Server 120 may serve content in a region that is served by multiple Central Offices.

The STB 105a may, in various implementations, store content that it receives. In one implementation, the STB 105a may store content in a database. In another implementation, the STB 105a may store content as a file in a file system. If the STB 105a needs additional space to store new content, the P2PCCR may, in one embodiment, replace content already stored on the STB 105a based on estimated future demand for the stored content and/or based on availability of the stored content on peer STBs, such as STB 105b.

Figure 2:
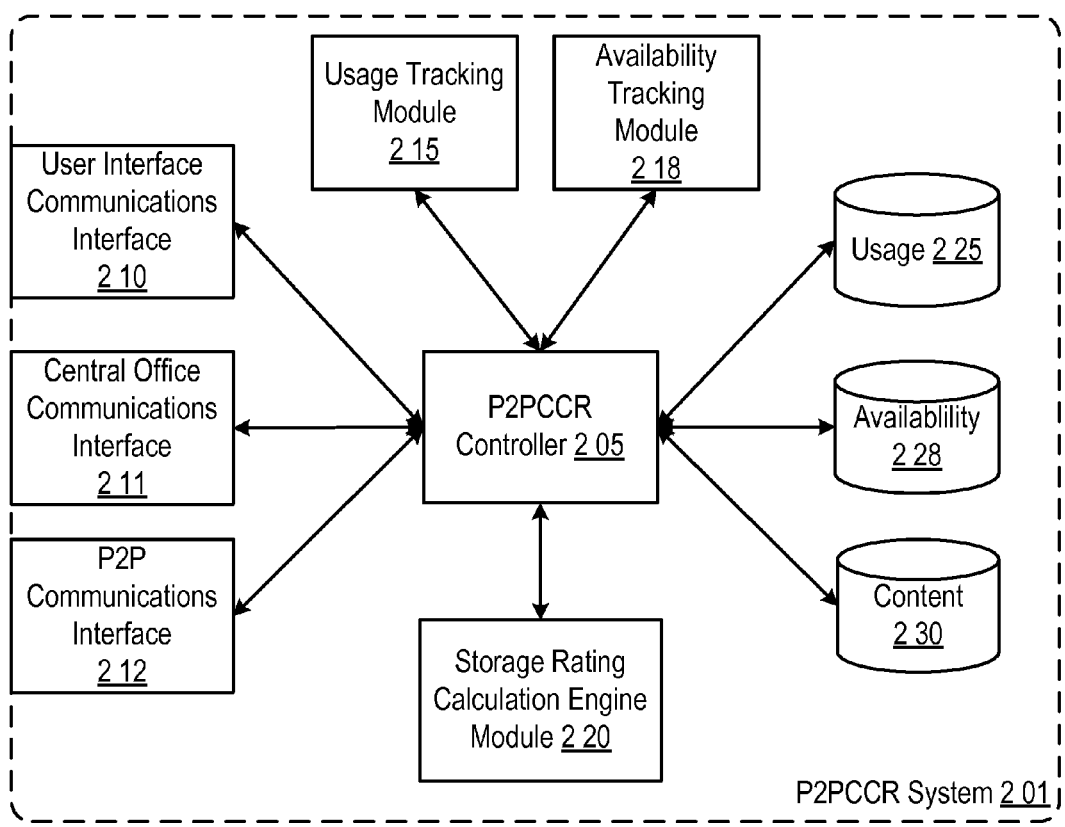
FIG. 2 shows an implementation of P2PCCR components in one embodiment of P2PCCR operation.

FIG. 2 shows an implementation of P2PCCR components in one embodiment of P2PCCR operation. The P2PCCR 201 may contain a number of functional modules and/or data stores. A P2PCCR controller 205 may serve a central role in some embodiments of P2PCCR operation, serving to orchestrate the reception, generation, and distribution of data and/or instructions, to, from, and between P2PCCR modules and/or mediate communications with external entities and systems.

In one embodiment, the P2PCCR controller 205 may be housed separately from other modules and/or databases within the P2PCCR, while in another embodiment, some or all of the other modules and/or databases may be housed within and/or configured as part of the P2PCCR controller. Further detail regarding implementations of P2PCCR controller operation, modules, and databases is provided below.

In the implementation illustrated in FIG. 2, the P2PCCR controller 205 may be configured to couple to external entities via various communications interfaces 210, 211, 212. The communications interfaces 210, 211, 212 may, for example, configure data received from the P2PCCR controller 205 and/or any of a variety of external entities for receipt and/or transmission to other entities and/or P2PCCR components. In one embodiment, a User Interface Communications Interface 210 may receive input from and/or send output to the user. Such input may, for example, include request for content, cancellation of request for content, rating of content, instructions to store/delete specified content, instructions to clear usage history, instructions to change application settings, and/or the like. The output sent to the user may, for example, include informational messages, confirmation messages, requested content, and/or the like. The output, in various embodiments, may include video, audio, images, text, and/or the like.

A Central Office Communications Interface 211 may, in one embodiment, serve to send data and instructions to and/or receive data and instructions from the equipment in the Central Office. A P2P Communications Interface 212 may, in one embodiment, serve to send data and instructions to and/or receive data and instructions from the peer STBs. The data sent and/or received through these communications interfaces may include content, information about content, usage and/or availability information about content, and/or the like. The instructions sent and/or received through these communications interfaces may include commands to send and/or receive data, commands to clear cache, and/or the like. In one implementation, either the Central Office Communications Interface 211 or the P2P Communications Interface 212 may be used by the P2PCCR. In another implementation, both the Central Office Communications Interface 211 and the P2P Communications Interface 212 may be used by the P2PCCR. For example, Central Office Communications Interface 211 and/or P2P Communications Interface 212 may serve to configure data into application, transport, network, data link, and/or physical layer formats in accordance with a TCP/IP communications model. The Central Office Communications Interface 211 and/or P2P Communications Interface 212 may further be configurable to implement and/or translate Session Initiation Protocol (SIP), Real Time Streaming Protocol (RTSP), User Datagram Protocol (UDP), P2P, VoD and/or the like data formats and/or protocols. The communications interfaces 210, 211, 212 may further house one or more ports, jacks, antennas, and/or the like to facilitate wired and/or wireless communications with and/or within the P2PCCR.

In one implementation, the P2PCCR controller 205 may further be coupled to one or more databases configured to store and/or maintain P2PCCR data. A usage database 225 may contain information pertaining to usage of content offered by the provider to the subscribers, such as but not limited to content identifier (ID), content name, IDs of requesting STBs, locations of requesting STBs, number of requests for content, the last time that content was requested, content type, and/or the like. The information contained in the usage database 225 may help estimate demand for content offered by the provider. For example, this information may be used to determine demand estimates based on geographic, demographic, and/or the like factors. In various implementations, the usage database 225 may be stored entirely on equipment in a Central Office, stored in a distributive manner on the STBs, or stored in a hybrid manner wherein some parts of the database are stored on equipment in a Central Office and other parts are stored on the STBs. In one embodiment, the P2PCCR may employ usage information from usage database 225 in a Storage Rating Calculation Engine Module 220. An availability database 228 may contain information pertaining to availability of content offered by the provider to the subscribers, such as but not limited to content ID, content name, STBs that store content, number of STBs that store content, percent of STBs that store content, location of STBs that store content, content type, content location, and/or the like. The information contained in the availability database 228 may be used to estimate supply of content offered by the provider from peer STBs. For example, this information may be used to determine supply estimates based on geographic, demographic, and/or the like factors. In various implementations, the availability database 228 may be stored entirely on equipment in a Central Office, stored in a distributive manner on the STBs, or stored in a hybrid manner wherein some parts of the database are stored on equipment in a Central Office and other parts are stored on the STBs. In one embodiment, the P2PCCR may use information from availability database 228 in a Storage Rating Calculation Engine Module 220. A Content database 230 may, in one implementation, store content on a STB and/or information pertaining to content stored on the STB, such as but not limited to content ID, content file name, content type, content size, content location, number of times that content was viewed, the last time that content was viewed, content Storage Rating, content ranking, and/or the like. For example, the information stored in the Content database 230 may be used to retrieve content for display and/or playback to a user. In one embodiment, the P2PCCR may use information from Content database 230 in a Storage Rating Calculation Engine Module 220.

In one embodiment, the P2PCCR controller 205 may further be coupled to a plurality of modules configured to implement P2PCCR functionality and/or services. A usage tracking module 215 may, in one implementation, be configurable to collect and/or process data pertaining to usage of content. Upon receiving a request for content from a user, the usage tracking module 215 may store information regarding the request, store information regarding requested content, store information regarding the user, store information regarding the user's STB and update aggregate information. In one implementation, the equipment in the Central Office may collect and/or process the usage data via the usage tracking module 215. In another implementation, the peer STBs may collect and/or process the usage data via the usage tracking module 215. It is to be understood that a hybrid involving a combination of some or all of the above mentioned implementations, wherein one of the equipment in the Central Office and peer STBs collects the usage data and the other one processes the usage data, may also be implemented. In one implementation, the usage tracking module 215 may be used to collect data for storage in the usage database 225. An availability tracking module 218 may, in one implementation, be configurable to collect and/or process data pertaining to availability of content. Upon receiving request for content from a user, the availability tracking module 218 may, if the content is not already stored on the user's STB, obtain requested content, store information regarding requested content, store information regarding the user, store information regarding the user's STB and update aggregate information. If old content was deleted from the user's STB, the availability tracking module 218 may also update information regarding deleted content. In one implementation, the equipment in the Central Office may collect and/or process the availability data via the availability tracking module 218. In another implementation, the peer STBs may keep track of the availability data via the availability tracking module 218. It is to be understood, that a hybrid involving a combination of some or all of the above mentioned implementations, wherein one of the equipment in the Central Office and peer STBs collects the availability data and the other one processes the availability data, may also be used. In one implementation, the availability tracking module 218 may be used to collect data for storage in the availability database 228.

A Storage Rating Calculation Engine Module 220 may be used, in one embodiment, to calculate a Storage Rating associated with storing specified content on a specified STB. In one implementation, the equipment in the Central Office may calculate Storage Ratings via the Storage Rating Calculation Engine Module 220. In another implementation, the peer STBs may calculate Storage Ratings via the Storage Rating Calculation Engine Module 220. It is to be understood, that a hybrid involving a combination of some or all of the above mentioned implementations, wherein some of the calculations are done by the equipment in the Central Office and some of the calculations are done by the peer STBs, may also be used. The Storage Rating may represent the rank, value and/or the like of storing specified content on a specified STB based on estimated future demand for the specified content and/or based on availability of the specified content on peer STBs. In one implementation, the Storage Rating Engine Module 220 may recalculate the Storage Rating associated with storing specified content every time the Storage Rating for the specified content is requested. In another implementation, the Storage Rating Engine Module 220 may return a previously calculated Storage Rating for the specified content.

In one embodiment, content associated with the lowest Storage Rating, as calculated by the Storage Rating Calculation Engine Module 220, may be replaced in the requester's STB storage if the requester's STB needs additional space for requested and/or new content. In one implementation, the Storage Rating Calculation Engine Module 220 may replace one or more content files with lowest Storage Ratings, defined by the function $v(f,\tau)$, stored in STB storage, until enough room is available to hold the requested content file, wherein the function $v(f,\tau)$ is equal to the Storage Rating of a file fat time $\tau$. For example, suppose the cache contains files $f_1, f_2, \ldots, f_n$. If the user requests a new file $f_0$ at time $\tau$ that is not in the cache, the Storage Rating Calculation Engine Module 220 may compute the values $v(f,\tau)$, $i=1, \ldots, n$ and the P2PCCR may delete the files with the lowest values until enough room is available to hold the most valuable files and the new file.

In one implementation $v(f,\tau)$ may be defined as $v(f,\tau)=a(f,\tau)[B(c(f,\tau)-1,a(f,\tau))-B(c(f,\tau),a(f,\tau))]$, wherein $a(f,\tau)$=the estimated number of peers concurrently downloading file f shortly after time $\tau$; $c(f,\tau)$=the number of peers that can serve f at time $\tau$; and $B(c,a)$ is the blocking probability in an Erlang blocking system with c servers and offered load a as discussed in "Introduction to Queuing Theory," by R. B. Cooper (North Holland, 2nd ed., 1981; ISBN 0444003797) (hereinafter, "Cooper"), which is incorporated in its entirety herein by reference. The number of peers concurrently downloading file f shortly after time $\tau$ may be estimated by analyzing the usage data, by analyzing the downloads currently in progress, and/or the like. A peer can serve f at time $\tau$ if the peer has file f at time $\tau$ and if the peer has enough uplink bandwidth to play out file f. Availability data, bandwidth data, and/or the like may be used to calculate the number of peers that can serve f at time $\tau$.

In one implementation, the quantity $c(f_0,\tau)$ may represent the number of peers available to serve $f_0$ at the time a request for $f_o$ occurs. The P2PCCR may treat the peer that has just requested $f_0$ at time $\tau$ as already having $f_o$. If that peer can serve $f_o$, then the P2PCCR may set $c(f_0,\tau)$ equal to 1 plus the number of other peers that can serve $f_o$. If the peer cannot serve $f_0$, then the P2PCCR may not add 1. The quantities $c(f,\tau)$ with $i>0$ remain unchanged since $\tau$ is not a request time for any f with $i>0$ and the availability is unchanged. The P2PCCR may estimate the number of peers concurrently downloading file f shortly after time $\tau$ using data in the usage and/or availability databases.

The function $v(f,\tau)$ represents how much the addition of a file to a peer's cache can reduce traffic from the central server. The quantity $aB(c,a)$ is the overflow traffic from c peers receiving offered load a. Overflow traffic may comprise content that comes from a Network Server because no peer can presently provide it. A difference $aB(c-1,a)-aB(c,a)$ is how much more traffic overflows from c-1 peers than from c peers. The function $v(f,\tau)$ therefore counts the increase in the load that overflows to the server when we remove file f. Turning this around, we can say that the function $v(f,\tau)$ measures how much keeping f in a peer's cache reduces the demand on the Network Server. To illustrate the properties of the function $v(f,\tau)$, write $p(c)=aB(c-1,a)-aB(c,a)$. Then, as discussed in Cooper, p. 89, p(c) may be interpreted as follows. Imagine that some large number of peers are labeled with indexes c=1, 2, 3, ... and that any arriving request for a peer always chooses the lowest numbered available peer. Then p(c) is the probability that the c'th peer is busy. Given this interpretation, it follows that as the offered load a increases, any given peer is busier, and that as c increases, p(c) decreases—that is, with the same offered load, a high-numbered peer is less busy than a low-numbered peer. Therefore, it follows that if peers request a title more often, the value of caching it goes up, and that if more peers already have the title, the value of caching it goes down.

Figure 3A:
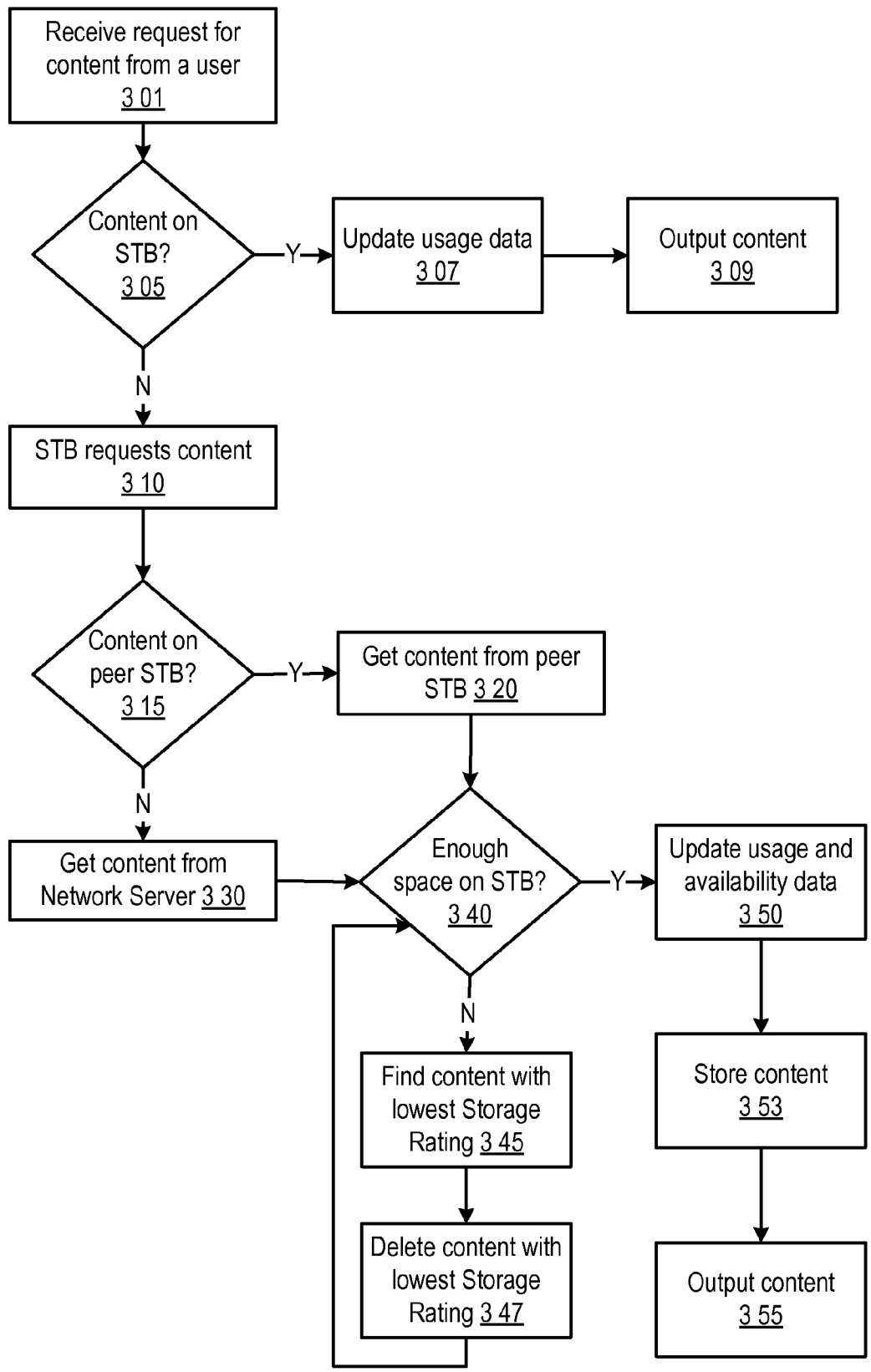
FIG. 3A shows an implementation of logic flow for obtaining, storing and outputting user requested content in one embodiment of P2PCCR operation.

FIG. 3A shows an implementation of logic flow for obtaining, storing and outputting user requested content in one embodiment of P2PCCR operation. In FIG. 3A, a STB may receive a request for content that the user desires 301. The user may request content in a variety of ways including selecting the content directly, such as from a user interface menu, scheduling the STB to request content available at a specified time, and/or the like. A determination may be made whether the requested content is available on the STB 305. In one implementation, this determination may be made by checking the Content database. In another implementation, this determination may be made by checking the data in the availability database. If the content is already present on the STB, the P2PCCR may update the usage data 307 and output the content requested by the user 309 for display and/or playback. In one embodiment, the availability data and/or usage data may be stored on the STB. In another embodiment, a peer STB may be queried to obtain availability data and/or usage data. In yet another embodiment, the equipment in the Central Office may be queried to obtain availability data and/or usage data. It is to be understood, that a hybrid involving a combination of some or all of the above mentioned embodiments, wherein some data may be available on the STBs and some data may be available from the equipment in the Central Office, may also be used.

If the content is not present on the STB, a request may be made to obtain such content 310. In one embodiment, the request for content may be made to a peer STB. In another embodiment, the request for content may be made to the equipment in the Central Office, which may direct content delivery from the Network Server or one or more peer STBs. In yet another embodiment, the request for content may be made to the Network Server. The P2PCCR may determine if the requested content is available from a peer STB 315. A peer STB may be defined in a variety of ways. In one embodiment, a peer STB may be any STB served by the Central Office that also serves the requesting STB. In another embodiment, a peer STB may be a predetermined group selected randomly, based on geographic proximity, based on network topology, and/or the like. If the requested content is available from a peer STB, the requested content may, in one embodiment, be obtained from the peer STB 320. In one implementation, one or more parts of the requested content may be obtained from multiple peers. If the requested content is not available from a peer, the requested content may be obtained from a Network Server 330. In one implementation, the content may be obtained directly from the Network Server. In another implementation, the content may be obtained from routers in the Central Office, wherein the routers forward the data from the Network Server to the requesting STB. It is to be understood, that a hybrid involving a combination of some or all of the above mentioned implementations, wherein some parts of the content may be obtained from a peer and some parts of the content may be obtained from the Network Server, may also be used.

For example, the P2PCCR may transfer content based on a peer to peer file sharing protocol such as BitTorrent. The BitTorrent Protocol Specification is available at http://www.bittorrent.org/begs/bep_0003.html and is incorporated in its entirety herein by reference. Alternative embodiments may use other peer to peer protocols such as Gnutella, Freenet, FastTrack, and/or the like. In one implementation, the STB may send a message using TCP/IP to a server in the Central Office requesting .torrent file for user requested content. Content may be treated as a series of equally sized data pieces. Upon receiving the .torrent file, the STB may contact the tracker specified in the .torrent file. The tracker may respond with a list of IP addresses of peers that may provide each data piece to the STB or with the IP address of the Network Server if the peers do not have the content. The STB may download each data piece from the supplied IP addresses. The STB may also send a message to the tracker to add the STB's IP address to the list of peers available to serve a data piece.

In one embodiment, the requested content may be stored on the requesting STB. In one embodiment, P2PCCR may determine if there is enough free space available to store the requested content on the requesting STB 340. If there is not enough free space available, P2PCCR may find content in the STB storage that has the lowest Storage Rating 345. In one embodiment, the Storage Rating may be calculated using the function v(f,t) shown above. In one implementation, data from the availability database and/or data from the usage database may be used in calculating the Storage Rating. For example, the P2PCCR may issue SQL commands to retrieve data from the usage database regarding the average number of peers per hour in the user's geographic area that had requested the content over the last week and may issue programmatic instructions to set a(f,τ) to be equal to that number. The P2PCCR may also issue SQL commands to retrieve data from the availability database regarding the number of peers available to serve the requested content in the user's geographic area and may issue programmatic instructions to set c(f,τ) to be equal to that number. It is to be understood, that the function v(f,t) shown above for calculating the Storage Rating is only one of a variety of implementations to determine Storage Rating using availability and usage data. In another embodiment, the Storage Rating may be retrieved from cache. In one embodiment, P2PCCR may delete content in the STB storage having the lowest Storage Rating 347 to make free space available for the requested content. The P2PCCR may return to 340 to continue the process of finding and deleting the content in the STB storage, until there is enough space to store the requested content. The P2PCCR may also update the usage and/or availability data 350. The P2PCCR may also update the Content database and/or store the requested content in STB storage 353, and output the content requested by the user 355 for display and/or playback. In one implementation, P2PCCR may store the requested content once space is available for the entire requested content. In another implementation, P2PCCR may store some parts of the requested content regardless of whether space is available for the entire requested content and free up space as needed to store other parts.

If there is enough space to store the requested content, the P2PCCR may, in one embodiment, update the usage and/or availability data 350. The P2PCCR may also update the Content database and/or store the requested content in STB storage, such as in a file, 353, and output the content requested by the user 355 for display and/or playback. In one implementation, the P2PCCR may determine content type, obtain codec necessary to decode the content, and output the content for display and/or playback using the codec. Determination of the content type, in one implementation, may include examining the file containing the content for content type identification information; e.g., using UNIX grep to find a file type, such as grepping for a "ftyp4VP" string indicative of an MPEG4 video file. In another embodiment, FFmpeg codecs and/or libraries may be used for decoding and playback.

FFmpeg documentation is available at http://ffmpeg.org/documentation.html and is incorporated in its entirety herein by reference.

Figure 3B:
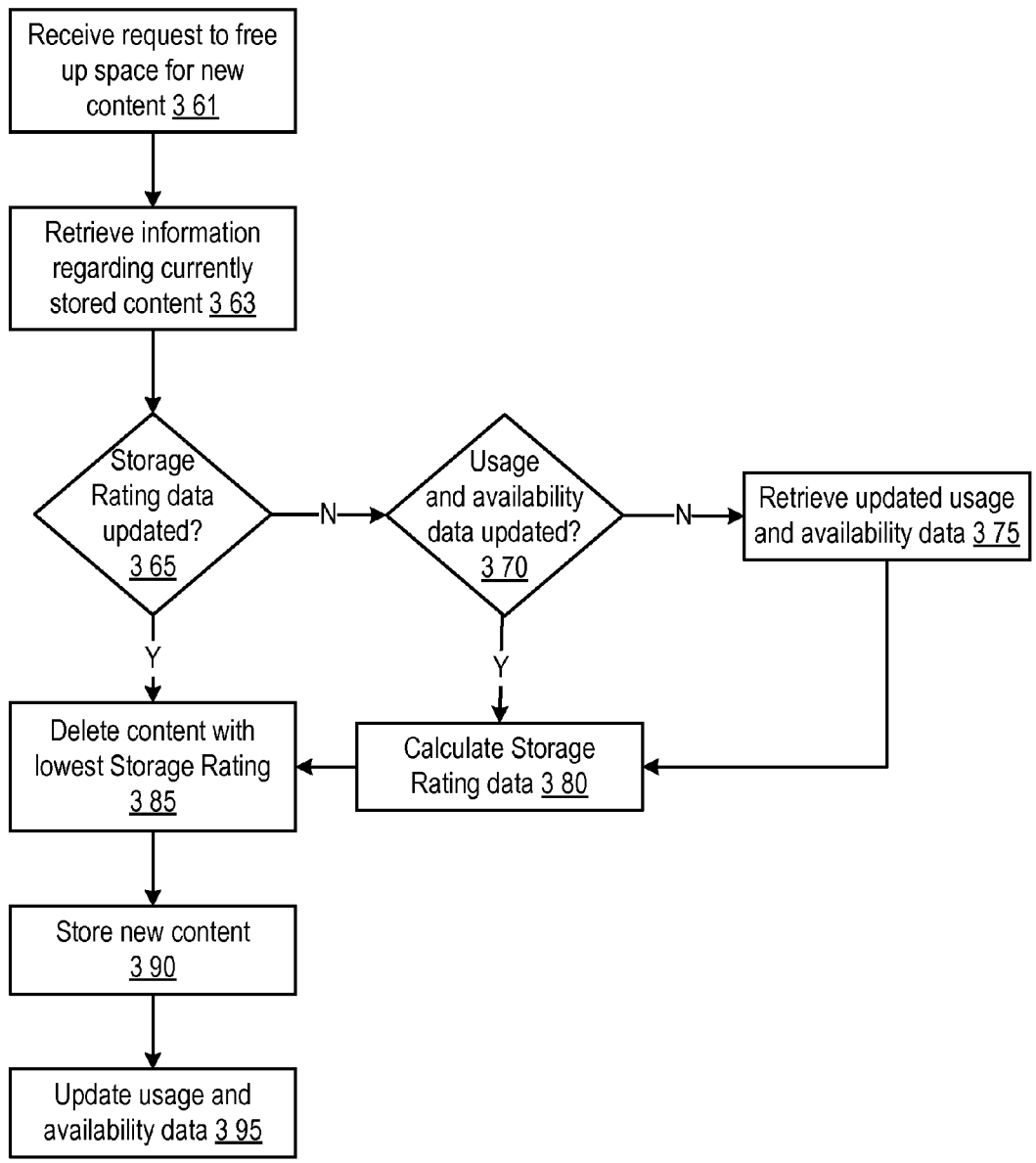
FIG. 3B shows an implementation of logic flow for processing a request to free up space for new content in another embodiment of P2PCCR operation.

FIG. 3B shows an implementation of logic flow for processing a request to free up space for new content in another embodiment of P2PCCR operation. The P2PCCR may receive a request, entailing the P2PCCR to free up space for new content 361. An inquiry may be made for information regarding the content currently stored in the STB storage 363. In one embodiment, such information may include content ID, content file name, content size, cached content Storage Rating, date when the cached content Storage Rating was last updated, and/or the like. In another embodiment, such information may also include the data available in the usage database and/or in the availability database.

In one embodiment, the Storage Ratings for content are always recalculated when a request to free up space for new content is received. In another embodiment, the Storage Ratings for content may be cached. The cached Storage Rating data may be stored in the usage database, in the availability database, and/or in the Content database. If Storage Ratings can be cached, the P2PCCR may determine if the Storage Rating data is updated 365. In one implementation, Storage Ratings may be updated if a specified period of time has passed since the rating was last calculated. In another implementation, the Storage Ratings may be updated upon a happening of a specified event such as an indication by the P2PCCR that the cache contains invalid data, an indication by the P2PCCR that the cache should be cleared, and/or the like.

In one embodiment, data from the availability database and/or data from the usage database may be used in calculating Storage Ratings. In one embodiment, the availability data and/or usage data is always retrieved from the availability database and/or from the usage database respectively when calculating Storage Ratings for content 375. In another embodiment, the availability data and/or usage data may be cached. If the availability data and/or usage data is cached, the P2PCCR may determine if the cached availability data and/or usage data is updated 370. In one implementation, the availability data and/or usage data may be updated if a specified period of time has passed since the data was last cached. In another implementation, the availability data and/or usage data may be updated upon a happening of a specified event such as an indication by the P2PCCR that the cache contains invalid data, an indication by the P2PCCR that the cache should be cleared, and/or the like. If the cached availability data and/or usage data should be updated, the P2PCCR may update such data using the availability database and/or the usage database respectively 375.

If the Storage Ratings for content should be updated 380, the P2PCCR may use the updated availability data and/or usage data to calculate the Storage Ratings for content. In one implementation, Storage Rating may be calculated using the function v(f,t) shown above. It is to be understood, that the function v(f,t) shown above for calculating Storage Rating is only one of a variety of implementations to determine Storage Rating using availability and usage data. In one embodiment, P2PCCR may delete content stored in the STB storage having the lowest Storage Rating until there is enough free space available for the requested content 385, and store the new content in the STB storage and/or the new content data in the Content database 390. In one implementation, P2PCCR may wait until there is enough space available in the STB storage to store the new content before downloading the new content. In another implementation, P2PCCR may begin streaming the content to the STB in parts and delete existing content as the need arises to store an additional part. The P2PCCR may also update the usage data and/or the availability data stored in the usage database and/or in the availability database respectively 395.

Figure 4A:
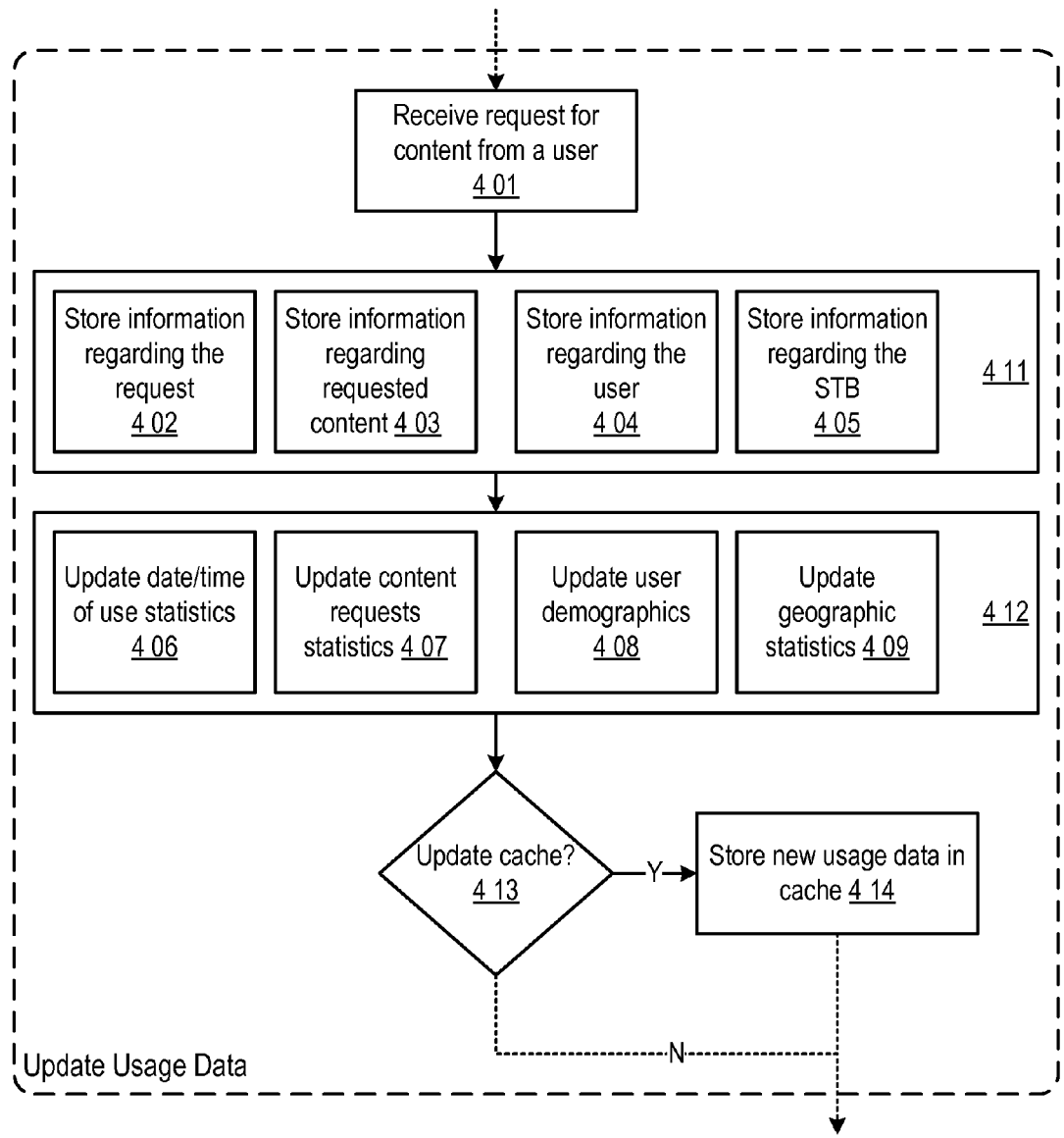
FIG. 4A shows an implementation of logic flow for updating usage information in one embodiment of P2PCCR operation.

FIG. 4A shows an implementation of logic flow for updating usage information in one embodiment of P2PCCR operation. In FIG. 4A, the P2PCCR may receive a request for content from a user 401. Upon receiving the request, the usage tracking module 215 may store a variety of information 411 that may be used in calculating a variety of usage statistics 412. In one implementation, the usage tracking module 215 may respond to an indication that content was requested by issuing programmatic instructions to collect data regarding the date and time of the request, the ID of the requested content, the ID of the requesting user, the ID of the requesting STB, and/or the like. In one embodiment, the ID of the requested content may be a file name. In one implementation, the usage tracking module 215 may also issue programmatic instructions to obtain the IP address of the STB. It may issue SQL commands to store the IP address of the STB in a table containing a list of IP addresses of STBs that requested the content in a SQL Usage database. The usage tracking module 215 may also issue SQL commands to retrieve data from the SQL Usage database and issue programmatic instructions to calculate statistics based on the retrieved data, such as by retrieving a counter field indicating how many STBs have requested the content, incrementing the counter by one, and storing the new value in the database. In another implementation, the usage tracking module 215 may issue SQL commands to retrieve further information, such as geographic location of the STB, from databases storing such information based on the aforementioned IDs. It may also issue SQL commands to store this data in a SQL Usage database. The usage tracking module 215 may also issue SQL commands to retrieve data from the SQL Usage database and issue programmatic instructions to calculate statistics based on the retrieved data, such as by retrieving a counter field indicating how many STBs from the STB's geographic location have requested the content, incrementing the counter by one, and storing the new value in the database. In one embodiment, the usage tracking module 215 may store information regarding the request 402. Such information may include the date of the request, the time of the request, and/or the like. In one implementation, date/time of use statistics may be updated 406 based on information regarding the request and/or based on other information. For example, the times during which the content is likely to be accessed, the average time between requests, and/or the like statistics may be updated. The usage tracking module 215 may also store information regarding the requested content 403. Such information may include the ID of the content, the type of the content, and/or the like. In one implementation, content requests statistics may be updated 407 based on information regarding the requested content and/or based on other information. For example, the total number and/or percent of requests for the content and/or for the content type, a metric comparing the number of requests for the content to the size of the content, and/or the like statistics may be updated. The usage tracking module 215 may also store information regarding the user 404. Such information may include the age of the user, the gender of the user, and/or the like. In one implementation, user demographics may be updated 408 based on information regarding the user and/or based on other information. For example, the number of users in a particular age group requesting the content, the gender of users requesting the content, and/or the like statistics may be updated. The usage tracking module 215 may also store information regarding the user's STB 405. Such information may include the ID of the STB, the geographic location of the STB, and/or the like. In one implementation, geographic statistics may be updated 409 based on information regarding the STB and/or based on other information. For example, the number and/or percent of requests for the content coming from a geographic region, the average time between requests for the content in a geographic region, and/or the like statistics may be updated. In one implementation, the P2PCCR may check whether the new usage data should be cached 413, and store the new usage data in cache 414.

Figure 4B:
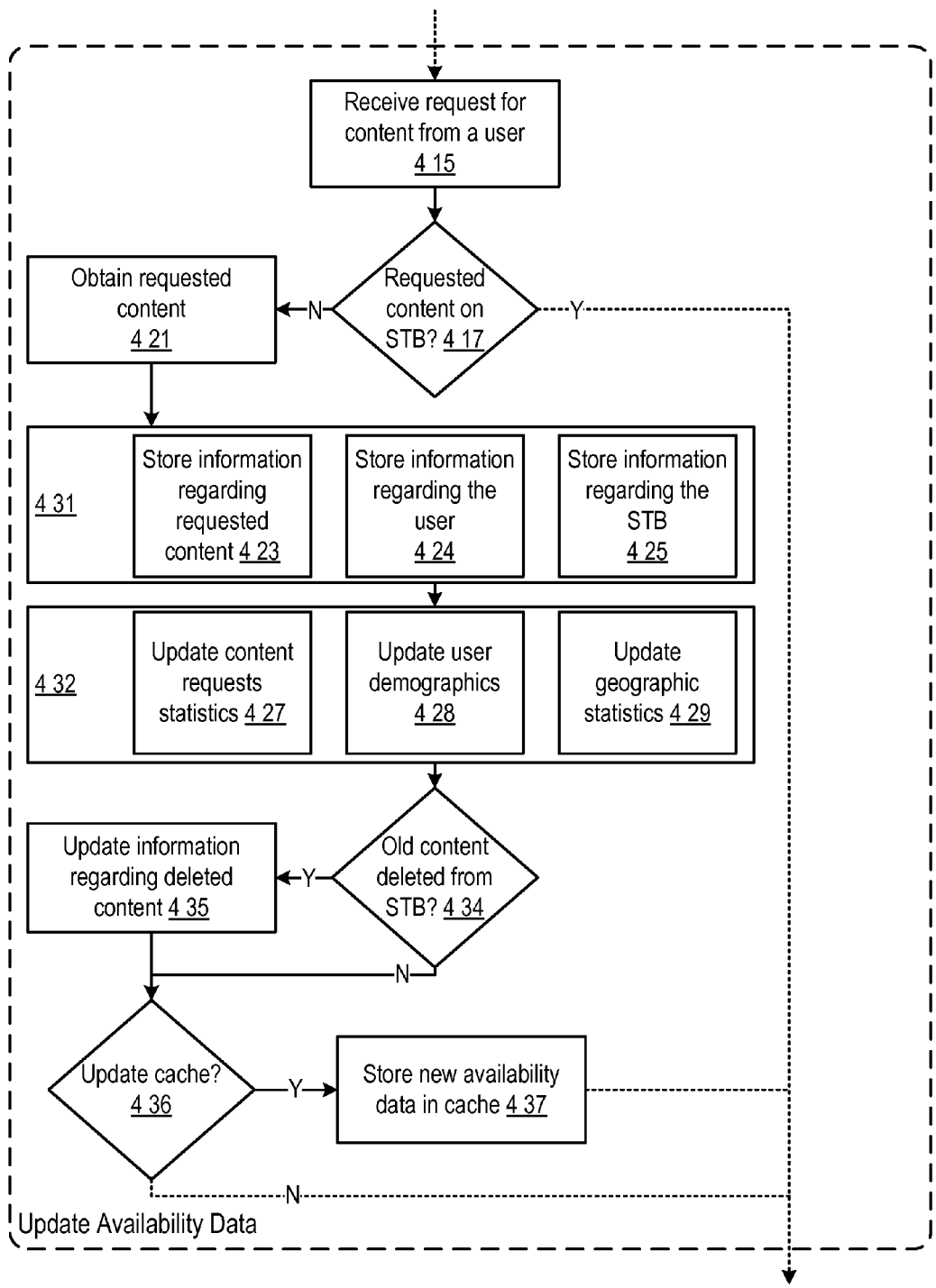
FIG. 4B shows an implementation of logic flow for updating availability information in one embodiment of P2PCCR operation.

FIG. 4B shows an implementation of logic flow for updating availability information in one embodiment of P2PCCR operation. In FIG. 4B, the P2PCCR may receive a request for content from a user 415. Upon receiving the request, the availability tracking module 218 may check if the requested content is already available on the user's STB 417. If the content is not already available, the P2PCCR may obtain the requested content 421 and update the availability data. The availability tracking module 218 may store a variety of information 431 that may be used in calculating a variety of availability statistics 432. In one implementation, the availability tracking module 218 may respond to an indication that content was requested by issuing programmatic instructions to collect data regarding the ID of the requested content, the ID of the requesting user, the ID of the requesting STB, and/or the like. In one embodiment, the ID of the requested content may be a file name. In one implementation, the availability tracking module 218 may also issue programmatic instructions to obtain the IP address of the STB. It may issue SQL commands to store the IP address of the STB in a table containing a list of IP addresses of STBs having portions or the entire contents of the requested content in a SQL Availability database. The availability tracking module 218 may also issue SQL commands to retrieve data from the SQL Availability database and issue programmatic instructions to calculate statistics based on the retrieved data, such as by retrieving a counter field indicating how many STBs are available to serve the content, incrementing the counter by one, and storing the new value in the database. In another implementation, the availability tracking module 218 may issue SQL commands to retrieve further information, such as the geographic location of the STB, from databases storing such information based on the aforementioned IDs. It may also issue SQL commands to store this data in a SQL Availability database. The availability tracking module 218 may also issue SQL commands to retrieve data from the SQL Availability database and issue programmatic instructions to calculate statistics based on the retrieved data, such as by retrieving a counter field indicating how many STBs from the STB's geographic location are available to serve the content, incrementing the counter by one, and storing the new value in the database. In one embodiment, the availability tracking module 218 may store information regarding the requested content 423. Such information may include the ID of the content, the type of the content, and/or the like. In one implementation, content requests statistics may be updated 427 based on information regarding the requested content and/or based on other information. For example, the total number and/or percent of peers available to serve the content and/or the content type, a metric comparing the number of peers available to serve the content to the size of the content, and/or the like statistics may be updated. The availability tracking module 218 may also store information regarding the user Such information may include the age of the user, the gender of the user, and/or the like. In one implementation, user demographics may be updated 428 based on information regarding the user and/or based on other information. For example, the amount of time that users in a particular age group have the content available before it is overwritten, the amount of time that users in a particular gender group have the content available before it is overwritten, and/or the like statistics may be updated. The availability tracking module 218 may also store information regarding the user's STB 425. Such information may include the ID of the STB, the geographic location of the STB, and/or the like. In one implementation, geographic statistics may be updated 429 based on information regarding the STB and/or based on other information. For example, the number and/or percent of peers available to serve the content in a geographic region, the average time that peers in a geographic region store the content, and/or the like statistics may be updated. The availability tracking module 218 may also check whether old content was deleted from the user's STB 434. If old content was deleted from the user's STB, the availability tracking module 218 may update availability information associated with deleted content 435. In one implementation, the P2PCCR may check whether the new availability data should be cached 436, and store the new availability data in cache 437.

Figure 4C:
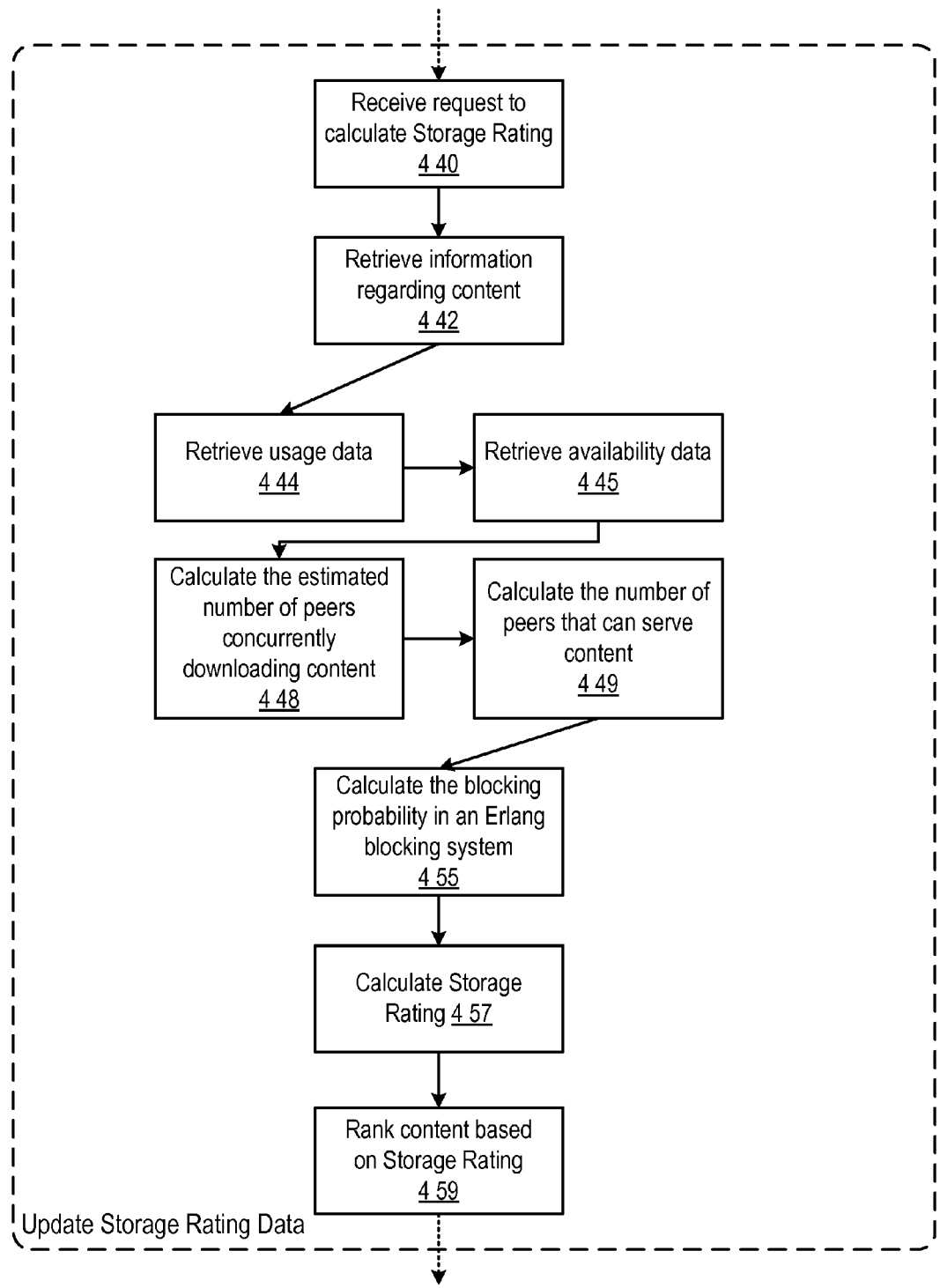
FIG. 4C shows an implementation of logic flow for calculating a Storage Rating associated with storing specified content on a specified STB in one embodiment of P2PCCR operation.

FIG. 4C shows an implementation of logic flow for calculating a Storage Rating associated with storing specified content on a specified STB in one embodiment of P2PCCR operation. In FIG. 4C, the P2PCCR may receive a request 440 to calculate Storage Ratings for content stored on a user's STB. An inquiry may be made to retrieve information regarding the content stored in the STB storage 442. Such information may include data from the Content database such as the IDs of stored content, the size of each content file, and/or the like. An inquiry may also be made to retrieve information regarding usage data 444 and availability data 445. Such information may include data for calculating the estimated number of peers concurrently downloading content $a(f,\tau)$ 448 and the number of peers that can serve content $c(f,\tau)$ 449 as described above. For example, geographic, demographic and/or the like data may be used to define the peers of the requesting STB, while the number of STBs that store content and the number of STBs that requested content may be used in the calculations. The value of the blocking probability in an Erlang blocking system $B(c,a)$ 455 and of Storage Rating $v(f,\tau)$ 457 may be calculated based on $a(f,\tau)$ and $c(f,\tau)$ as described above. It is to be understood, that retrieving information and performing calculations may be done for each file in turn, for all files at the same time, in a hybrid way combining the two approaches, and/or the like. Stored content may be ranked or rated based on Storage Rating $v(f,\tau)$ 459. In one implementation, the stored content may be ranked after all content files received a ranking. In another implementation, the stored content may be ranked as each file is ranked. In one embodiment, Storage Ratings and/or rankings may be stored by the P2PCCR. In one implementation, Storage Ratings and/or rankings may be stored in the Content database.

P2PCCR Controller

FIG. 5 illustrates inventive aspects of a P2PCCR controller 501 in a block diagram. In this embodiment, the P2PCCR controller 501 may serve to aggregate, process, store, search, serve, identify, instruct, generate, match, and/or facilitate interactions with a computer through a variety of information technologies, and/or other related data.

Typically, users, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the P2PCCR controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The P2PCCR controller 501 may be based on computer systems that may comprise, but are not limited to, components such as: a computer systemization 502 connected to memory 529.

Computer Systemization

A computer systemization 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effect communications, operations, storage, etc. Optionally, the computer systemization may be connected to an internal power source 586. Optionally, a cryptographic processor 526 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the P2PCCR controller and beyond through various interfaces. Should processing requirements dictate a greater amount speed and/or capacity, distributed processors (e.g., Distributed P2PCCR), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the P2PCCR may be achieved by implementing a microcontroller such as CAST's R8051XC2 microcontroller; Intel's MCS 51 (i.e., 8051 microcontroller); and/or the like. Also, to implement certain features of the P2PCCR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the P2PCCR component collection (distributed or otherwise) and/or features may be implemented via the microprocessor and/or via embedded components; e.g., via ASIC, coprocessor, DSP, FPGA, and/or the like. Alternately, some implementations of the P2PCCR may be implemented with embedded components that are configured and used to achieve a variety of features or signal processing.

Depending on the particular implementation, the embedded components may include software solutions, hardware solutions, and/or some combination of both hardware/software solutions. For example, P2PCCR features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the P2PCCR features. A hierarchy of programmable interconnects allow logic blocks to be interconnected as needed by the P2PCCR designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the P2PCCR may be developed on regular FPGAs and then migrated into a fixed version that more resembles ASIC implementations. Alternate or coordinating implementations may migrate P2PCCR controller features to a final ASIC instead of or in addition to FPGAs. Depending on the implementation all of the aforementioned embedded components and microprocessors may be considered the "CPU" and/or "processor" for the P2PCCR.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the P2PCCR thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like.

Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the P2PCCR controller is accessible through remote clients 533*b* (e.g., computers with web browsers) by users 533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed P2PCCR), architectures may similarly be employed to pool, load balance, and/or otherwise increase the communicative bandwidth required by the P2PCCR controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the P2PCCR controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the P2PCCR controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the P2PCCR controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the P2PCCR component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the P2PCCR controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the P2PCCR controller to communicate with other entities through a communications network 513. Various communication protocols may be used by the P2PCCR controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the P2PCCR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the P2PCCR database 519, operating systems, other program components, user interfaces, Web browsers, and/or the like.

Access to the P2PCCR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the P2PCCR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the P2PCCR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the P2PCCR enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the P2PCCR.

Access to the P2PCCR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the P2PCCR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the P2PCCR component to engage in secure transactions if so desired. The cryptographic component facilitates the secure accessing of resources on the P2PCCR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The P2PCCR Database

The P2PCCR database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the P2PCCR database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the P2PCCR database is implemented as a data-structure, the use of the P2PCCR database 519 may be integrated into another component such as the P2PCCR component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519*a-c*. A usage table 519*a* includes fields such as, but not limited to: content ID, content name, IDs of requesting STBs, locations of requesting STBs, number of requests for content, the last time that content was requested, content type, and/or the like. The usage table may contain information pertaining to usage of content offered by the provider to the subscribers on the P2PCCR and may help estimate demand for content offered by the provider. An availability table 519*b* includes fields such as, but not limited to: content ID, content name, STBs that store content, number of STBs that store content, percent of STBs that store content, location of STBs that store content, content type, content location, and/or the like. The availability table may contain information pertaining to availability of content offered by the provider to the subscribers on the P2PCCR and may help estimate supply of content offered by the provider from peer STBs. A Content table 519*c* includes fields such as, but not limited to content ID, content file name, content type, content size, content location, number of times that content was viewed, the last time that content was viewed, content Storage Rating, content ranking and/or the like. The Content table may, in one implementation, store content on a STB and/or information pertaining to content stored on the STB, and may be used to retrieve content for display and/or playback to a user.

In one embodiment, the P2PCCR database may interact with other database systems. For example, employing a distributed database system, queries and data access by search P2PCCR component may treat the combination of the P2PCCR database, an integrated data security layer database as a single database entity.

In one embodiment, user programs may contain various user interface primitives, which may serve to update the P2PCCR. Also, various accounts may require custom database tables depending upon the environments and the types of clients the P2PCCR may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-c*. The P2PCCR may be configured to keep track of various settings, inputs, and parameters via database controllers.

The P2PCCR database may communicate to and/or with other components in a component collection, including itself, and/or facilities of the like. Most frequently, the P2PCCR database communicates with the P2PCCR component, other program components, and/or the like. The database may contain, retain, and provide information regarding other nodes and data.

The P2PCCRs

The P2PCCR component 535 is a stored program component that is executed by a CPU. In one embodiment, the P2PCCR component incorporates any and/or all combinations of the aspects of the P2PCCR that was discussed in the previous figures. As such, the P2PCCR affects accessing, obtaining and the provision of information, services, transactions, and/or the like across various communications networks.

The P2PCCR component enables optimization of P2P content delivery system performance by making storage decisions with usage information, availability information, and/or the like, and use of the P2PCCR.

The P2PCCR component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the P2PCCR server employs a cryptographic server to encrypt and decrypt communications. The P2PCCR component may communicate to and/or with other components in a component collection, including itself, and/or facilities of the like. Most frequently, the P2PCCR component communicates with the P2PCCR database, operating systems, other program components, and/or the like. The P2PCCR may contain, communicate, generate, obtain, and/or provide program component, system, user, and/or data communications, requests, and/or responses.

Distributed P2PCCRs

The structure and/or operation of any of the P2PCCR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the P2PCCR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A content replacement processor-implemented method, comprising:

receiving a request for new content at a peer device connected to a peer to peer network;

requesting usage and availability data for content stored on the peer device;

obtaining the requested usage and availability data;

determining value ratings for the content stored on the peer device based on the usage and availability data, wherein:

the usage data includes information pertaining to usage of the new content and the availability data includes information pertaining to availability of content offered by a provider to subscribers, and determining the value ratings for the content stored on the peer device includes:
analyzing the usage data to estimate a number of peers that are concurrently downloading the content stored on the peer device shortly after the request for the new content, and
calculating a number of peers that can serve the new content; and
replacing lowest value rated for the content stored on the peer device with said new content.

2. The method of claim 1, wherein content is replaced using a peer-to-peer video distribution system.

3. The method of claim 1, wherein the content is stored on a storage device communicatively coupled to the peer device.

4. The method of claim 1, wherein the usage or availability data may be based on user profiles.

5. The method of claim 1, wherein the usage or availability data may be based on user preferences.

6. The method of claim 1, wherein usage data, availability data and value rankings are cached.

7. The method of claim 1, further comprising, updating usage and availability data.

8. A content replacement apparatus, comprising:
a memory;
a processor disposed in communication with said memory, and configured to issue a plurality of processing instructions stored in the memory, wherein the processor issues instructions to:
receive a request for new content at a peer device connected to a peer to peer network;
request usage and availability data for content stored on the peer device;
obtain the requested usage and availability data;
determine value ratings for the content stored on the peer device based on the usage and availability data, wherein:
the usage data includes information pertaining to usage of the new content and the availability data includes information pertaining to availability of content offered by a provider to subscribers, and
determining the value ratings for the content stored on the peer device includes:
analyzing the usage data to estimate a number of peers that are concurrently downloading the content stored on the peer device shortly after the request for the new content, and
calculating a number of peers that can serve the new content; and
replace lowest value rated for the content stored on the peer device with said new content.

9. A computer program product recorded on a non-transitory computer readable medium, comprising:
processor readable instructions stored in the non-transitory computer readable medium, wherein the processor readable instructions are issuable by a processor to:
receive a request for new content at a peer device connected to a peer to peer network;
request usage and availability data for content stored on the peer device;
obtain the requested usage and availability data;
determine value ratings for the content stored on the peer device based on the usage and availability data, wherein:
the usage data includes information pertaining to usage of the new content and the availability data includes information pertaining to availability of content offered by a provider to subscribers, and
determining the value ratings for the content stored on the peer device includes:
analyzing the usage data to estimate a number of peers that are concurrently downloading the content stored on the peer device shortly after the request for the new content, and
calculating a number of peers that can serve the new content; and
replace lowest value rated for the content stored on the peer device with said new content.

10. A content replacement processor-implemented method comprising:
receiving a request for new content at a peer device connected to a peer to peer network;
requesting usage and availability data for content stored on the peer device; obtaining the requested usage and availability data;
determining value ratings for the content stored on the peer device based on the obtained usage and availability data, wherein the usage data includes information pertaining to usage of the new content and the availability data includes information pertaining to availability of content offered by provider to subscribers and
wherein determining the value ratings includes analyzing the usage data to estimate a number of peers that are concurrently downloading the new content shortly after the request for the new content and calculating a number of peers that can serve the new content to the peer device shortly after the request for the new content;
replacing lowest value rated content with said new content;
obtaining updated information regarding the content stored on the peer device; and
updating the usage and availability data based on the updated information.

11. A content replacement apparatus, comprising: a memory; a processor disposed in communication with said memory, and configured to issue a plurality of processing instructions stored in the memory, wherein the processor issues instructions to:
receive a request for new content at a peer device connected to a peer to peer network;
request usage and availability data for content stored on the peer device;
obtain the requested usage and availability data;
determine value ratings for the content stored on the peer device based on the obtained usage and availability data, wherein the usage data includes information pertaining to usage of the new content and the availability data includes information pertaining to availability of content offered by provider to subscribers and
wherein determining the value ratings includes analyzing the usage data to estimate a number of peers that are concurrently downloading the new content shortly after the request for the new content and calculating a number of peers that can serve the new content to the peer device shortly after the request for the new content;
replace lowest value rated content with said new content;
obtain updated information regarding the content stored on the peer device; and
update the usage and availability data based on the updated information.

12. The method of claim 1, wherein the availability data comprises a numerical count of other peer devices in the peer to peer network storing the new content.

13. The method of claim 12, wherein the availability data further comprises geographical locations of the other peer devices in the peer to peer network storing the new content.

14. The method of claim 1 wherein the value ratings represent a reduction in traffic to a central server for content stored on the peer device.

15. The method of claim 1, further comprising:
   determining that there is not sufficient space to store the new content on the peer device; and
   deleting the lowest value rated content until there is sufficient space for the new content.

16. The method of claim 1, further comprising using the peer device to collect the usage data.

17. The method of claim 16, further comprising:
   determining, using the server, the value ratings; and
   providing the value ratings to the peer device from the server.

18. The method of claim 16, further comprising using the server to analyze the usage data and calculate the number of peers that can serve the new content.

19. The method of claim 1, further comprising recalculating the value rating associated with the content stored at the peer device every time new content is requested.

20. The method of claim 1, further comprising providing a previously determined value rating associated with the content when the new content is requested.

21. The method of claim 14, wherein the reduction in traffic to the central server is determined based on a measure of an increase in traffic to the central server when content stored on the peer device is removed.

22. The apparatus of claim 11, wherein the processor issues instructions to:
   determine at least one of the peers in the peer to peer network to provide the new content; and
   instruct the peer in the peer to peer network to provide the new content to the peer device.

23. The apparatus of claim 22, wherein the processor issues instructions to:
   determine the at least one of the peers based on at least one of network topology, geographic proximity, or randomly.

24. The apparatus of claim 23, wherein the processor issues instructions to:
   provide instructions to multiple peers to provide portions of the new content.

25. The method of claim 15, further comprising,
   storing a portion of the new content regardless of whether there is enough space for the entire new content at the peer device; and
   deleting the lowest value rated content until there is sufficient space for remaining portions of the new content.

* * * * *